Oct. 15, 1940.   S. G. JOHNSON   2,218,111
GAUGE FOR TAPERED SCREW THREADS
Filed Sept. 18, 1939
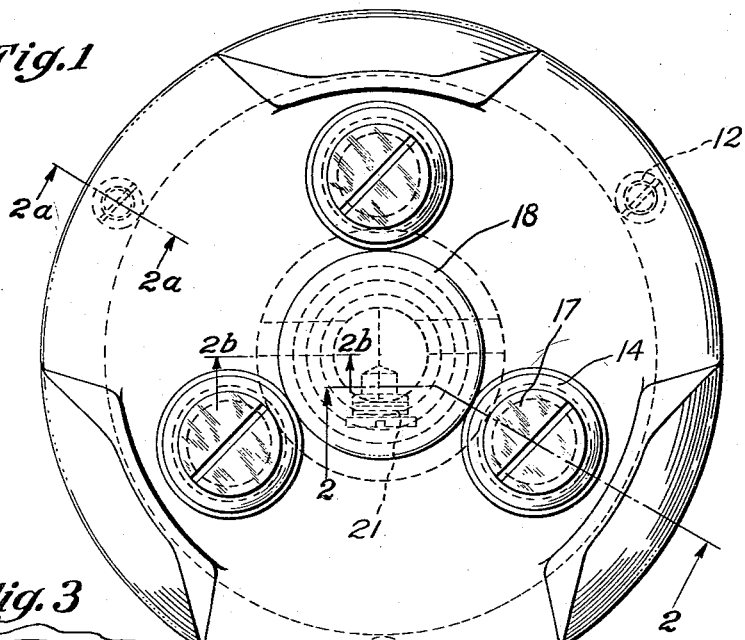
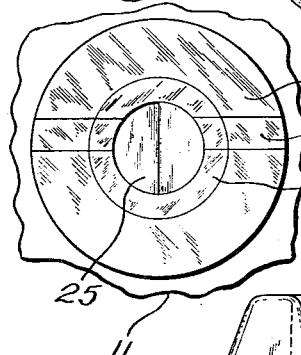
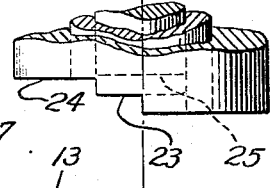
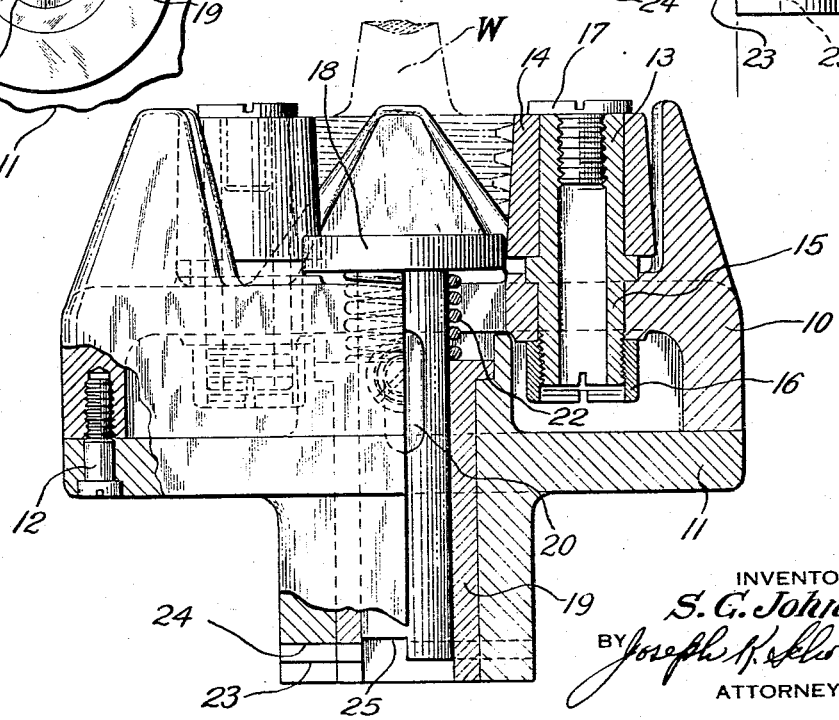
INVENTOR
S. G. Johnson
BY Joseph K. Klofield
ATTORNEY Patented Oct. 15, 1940

2,218,111

UNITED STATES PATENT OFFICE 2,218,111

GAUGE FOR TAPERED SCREW THREADS

Stanley G. Johnson, Hartford, Conn., assignor to Niles-Bement-Pond Company, Hartford, Conn., a corporation of New Jersey Application September 18, 1939, Serial No. 295,477

5 Claims. (Cl. 33—199)

This invention relates to gauges and particularly to a gauge for external tapered screw threads such as standard pipe threads.

More particularly the invention relates to means for gauging the taper on the outside diameter of the screw threads at the crests of the threads.

A primary object of the invention is to determine the correctness of the taper and the diameters of external tapered screw threads.

A feature of the invention is to provide quick gauging means of relatively simple form which will facilitate the gauging of the taper and the outside diameters of external tapered threads at the crests of the threads.

Another object of the invention is to provide this gauging means as a supplemental gauge for use in gauging tapered screw threads after the pitch diameters of the screw threads have been gauged in any usual type of tapered thread gauges.

With the above and other objects in view, the invention may include the features of construction and operation set forth in the following specification and illustrated in the accompanying drawing.

In the accompanying drawing annexed hereto and forming a part of this specification, I have shown the invention embodied in a hand type gauge for relatively small sizes of external tapered screw threads, but it will be understood that the invention can be otherwise embodied and that the drawing is not to be construed as defining or limiting the scope of the invention, the claims appended to this specification being relied upon for that purpose.

In the drawing:

Figure 1 is a plan view of a complete gauge made in accordance with the present invention.

Fig. 2 is a side elevation of the gauge partly in sections upon the planes of lines 2—2, 2ª—2ª, and 2ᵇ—2ᵇ in Fig. 1.

Fig. 3 is a plan view of the lower end surfaces of the gauge body member, and

Fig. 4 is a fragmentary side elevation of the lower end surfaces of the gauge viewed at right angles to the view shown in Fig. 2.

In the above mentioned drawing there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, a body member preferably made up of two principal parts securely fastened together; second, rotatably mounted frustums forming members adapted to contact the screw threads being tested; third, a flanged member movable axially and centrally within the body member and adapted to engage the end face of the screw threads being gauged; fourth, a spline and screw respectively in the flanged member and body member to retain the flanged member against rotation while permitting axial movement; fifth, a spring normally forcing the flanged member in a direction to engage the screw threads being gauged; and sixth, stepped surfaces at the lower end of the flanged member and body member to determine the axial position of the flanged member during the gauging operation.

Referring more in detail to the figures of the drawing, I provide a gauge having a body member comprising preferably an upper member 10 and a lower member 11, these two members being secured fixedly in position by means of clamping screws 12. Within the upper one of these members 10 are disposed sleeves 13 on which are individually mounted rotatable frustums 14, the apex angle of which may be predetermined in accordance with the taper of the screw threads being gauged. Each of these sleeves 13 has a cylindrical surface 15 eccentric to the bearing surface for the frustum 14 so that by rotating the sleeve 13 within the body member 10 the radial distance of the bearing portion thereof may be radially varied. A clamping nut 16 engaging the threaded lower end of the sleeve 14 enables the sleeve to be retained in any radially adjusted position and a headed screw 17 entering the upper end of the sleeve retains its frustum 14 in position.

In practice three sleeves 13 are used, each having a rotatable frustum 14 rotatable thereon. Within the space outlined by the frustums 14 the member W being gauged may be inserted. With the angle of the frustum 14 on each of the sleeves 13 equal and predetermined for the particular taper of the screw threads being gauged, a threaded member, if correctly tapered, will be contacted uniformly upon the crests of each pitch of the threads being gauged by the frustums.

It is highly important that the diameters of tapered screw threads should be accurately determined, particularly their outer diameters at the crests of the successive threads. This taper of the outside diameters should be identical with the taper of the pitch diameters of the screw threads which may be determined by any usual form of screw thread gauge. In order to determine the taper of external taper screw threads and its accuracy relative to a master, a flanged or headed member 18 is axially and centrally mounted within the body member 11 and preferably may have its stem portion slidable within a bearing member 19 tightly fitting a central bore of the body member 11. Axially extending within the stem portion of the flanged member 18 is a spline 20 which may be engaged by the inner end of a screw 21 threaded into the body member 11. By means of this spline 20 and screw 21 the axial movement of the flanged member 18 is limited and its rotation is prevented or materially restricted.

Between the upper end of the bearing member 19 for the stem of the flanged member 18 and the flange or head of this member is an open coil spring 22 urging the flanged member upward against the end of the screw threads W being gauged.

In order to determine the axial position of the flanged member 18 when in engaging position, the end face at the lower end of the body member 11 is formed with suitable step surfaces 23 and 24, these surfaces being of any desired number, there being but two milled-off portions indicated in the drawing. Each of the milled-off step portions 23 and 24 has a plane surface normal to the axis of the flanged member 18 and of the screw threads W being gauged. These milled portions 23 and 24 may, as indicated in Fig. 3, start from one of the diameters of the end face and have the first step extending partially across the diameter of the stem of the flanged member 18 and the second step across the remaining portion of this diameter. Also for convenience the lower end of the stem of the flanged member 18 may be stepped by having one half its diameter milled off to form a plane surface 25 disposed in a plane normal to the axis of this member and parallel to the end face of the member itself.

In operation a tapered screw thread member W is placed in contact with the rotatable frustums 14 and forced lightly against the upper face of flanged member 18. This causes the flanged member 18 to be retracted within the body member a variable distance determined by the diameters of the screw threads being gauged. With the tapered screw threads W being gauged firmly in contact with the contacting frustums 14, and with the upper face of the flanged member 18 engaging the inner or smaller end face of the screw threads, the position of the stepped portion 25 on the stem of the flanged member 18 relative to the stepped portions 23 and 24 on the body member 11 may be observed. Variations in the diameters or variations in taper at one or the other end of the taper threads W will cause the axial position of the flanged member 18 to vary and thus indicate the relative sizes of the screw thread diameters of taper screw thread members.

What I claim is:

1. A gauge for pipe thread tapers comprising in combination, a body member, a plurality of annularly spaced thread contacting members mounted therein, a flanged member within said body member engaging the end face of the threaded member being tested and axially retractible relative to the body member, a spring normally pressing said flanged member in one direction, stepped portions at the end of said flanged member, and stepped portions on said body member abutting said first mentioned stepped portions to determine the size of the member being gauged when the threads engage said contacting members and the end face of the member being gauged engages said flanged member.

2. A gauge for pipe thread tapers comprising in combination, a body member, a plurality of annularly spaced rotatable thread contacting members mounted therein, a flanged member within said body member engaging the end face of the threaded member being tested and axially retractible relative to the body member, a spring normally pressing said flanged member in one direction, stepped portions at the end of said flanged member, and stepped portions on said body member abutting said first mentioned stepped portions to determine the size of the member being gauged when the threads engage said contacting members and the end face of the member being gauged engages said flanged member.

3. A gauge for pipe thread tapers comprising in combination, a body member, a plurality of annularly spaced thread contacting members mounted therein, a flanged member within said body member having a plane end face engaging the smaller end face of the threaded member being tested and axially retractible relative to the body member, a spring normally pressing said flanged member in one direction, stepped portions having plane surfaces at the end of said flanged member, and stepped portions having plane surfaces on said body member abutting said first mentioned stepped portions of said flanged member to determine the size of the member being gauged when the threads engage said contacting members and the end face of the member being gauged engage said flanged member.

4. A gauge for pipe thread tapers comprising in combination, a body member, a plurality of annularly spaced thread contacting members mounted therein, a flanged member within said body member having a plane end face normal to the axis of the threaded member being gauged and engaging the end face thereof, said flanged member being axially retractible relative to the body member, a spring normally pressing said flanged member in one direction, stepped portions at the end of said flanged member, and stepped portions on said body member abutting said first mentioned stepped portions to determine the size of the member being gauged when the threads engage said contacting members and the end face of the member being gauged engages said flanged member.

5. A gauge for pipe thread tapers comprising in combination, a body member, a plurality of annularly spaced rotatable thread contacting members mounted therein, a flanged member within said body member having a plane end face engaging the end face of the threaded member being tested and axially retractible relative to the body member, a spring normally pressing said flanged member in one direction, stepped portions at the end of said flanged member having plane surfaces normal to the axis thereof, and stepped portions on said body member having plane surfaces normal to the axis of said flanged member and positioned at an angle to the stepped portions on said flanged member, said stepped portion abutting said first mentioned stepped portions to determine the size of the member being gauged when the threads engage said contacting members and the end face of the member being gauged engages said flanged member.

STANLEY G. JOHNSON.